US012610088B2

(12) United States Patent
Mei et al.

(10) Patent No.: US 12,610,088 B2
(45) Date of Patent: Apr. 21, 2026

(54) METHOD AND DEVICE FOR DECOMPRESSING DEMURA COMPENSATION VALUE BASED ON RANDOM-ACCESS BIT STREAM

(71) Applicant: Glenfly Tech Co., Ltd., Shanghai (CN)

(72) Inventors: Ao Mei, Shanghai (CN); Chuanchuan Zhu, Shanghai (CN); Wei Wang, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 522 days.

(21) Appl. No.: 18/189,255

(22) Filed: Mar. 24, 2023

(65) Prior Publication Data

US 2024/0129547 A1     Apr. 18, 2024

(30) Foreign Application Priority Data

Oct. 14, 2022     (CN) .......................... 202211258458.8

(51) Int. Cl.
*H04N 19/89* (2014.01)
*H04N 19/176* (2014.01)
*H04N 19/182* (2014.01)

(52) U.S. Cl.
CPC ........... *H04N 19/89* (2014.11); *H04N 19/176* (2014.11); *H04N 19/182* (2014.11)

(58) Field of Classification Search
None
See application file for complete search history.

(56) References Cited

U.S. PATENT DOCUMENTS

| 2009/0002762 | A1* | 1/2009 | Sakamoto | ................. | G06T 9/00 |
| | | | | | 358/1.18 |
| 2022/0163868 | A1* | 5/2022 | Wang | ..................... | H04N 23/73 |
| 2022/0238061 | A1* | 7/2022 | McDaniel | .............. | G09G 5/393 |
| 2023/0106250 | A1* | 4/2023 | Zhang | ................. | G09G 3/3696 |
| | | | | | 345/690 |

FOREIGN PATENT DOCUMENTS

| CN | 111767017 | A | 10/2020 |
| CN | 112073725 | A | 12/2020 |
| CN | 112199065 | A | 1/2021 |
| CN | 114467133 | A | 5/2022 |

OTHER PUBLICATIONS

Chinese Office Action (w/ English translation) for corresponding Application No. 202211258458.8, dated Jan. 11, 2024, 11 pages.

* cited by examiner

*Primary Examiner* — Nicholas J Lee
(74) *Attorney, Agent, or Firm* — Dority & Manning, PA

(57) ABSTRACT

Disclosed is a method and a device for decompressing Demura compensation value based on random-access bit stream. The method includes reading a target compression code corresponding to a target pixel set according to a screen refresh instruction in response to the screen refresh instruction, and decoding the target compression code to obtain Demura compensation values.

12 Claims, 3 Drawing Sheets

S101

Reading a target compression code corresponding to a target pixel set according to a screen refresh instruction in response to the screen refresh instruction

S102

Decoding the target compression code to obtain Demura compensation values

METHOD AND DEVICE FOR DECOMPRESSING DEMURA COMPENSATION VALUE BASED ON RANDOM-ACCESS BIT STREAM

CROSS-REFERENCE TO RELATED APPLICATION

The present application claims the priority of Chinese patent application No. 202211258458.8, filed on Oct. 14, 2022, entitled "Method for Decompressing Demura Compensation Value Based on Random-access Bit Stream" the disclosure of which is incorporated herein by reference in its entirety.

TECHNICAL FIELD

The present disclosure relates to the field of photoelectric display technology, and more particular, to a method and a device for decompressing Demura compensation value based on random-access bit stream.

BACKGROUND

OLED (Organic Light-Emitting Diode) display screens are becoming more and more popular in visual display technologies such as head mounted display devices due to their advantages of fast response. Due to the limitations of the fabrication processes, the OLED easily produces a Mura (from Japanese transliteration, denoting "speckle") phenomena. Demura is a process eliminating Mura (nonuniform effect). Demura refers to generating a compensation value for each pixel in a display screen, and burning the compensation value into a read-only memory (ROM) of a panel display driving chip to compensate the gray scale of each pixel during display, thereby finally making the full screen display evenly. In order to save resources of the ROM and reduce the cost of the chip, it is currently common to store a compression code, formed by compressing the Demura compensation value, in the ROM.

When the OLED display screen displays, the compression code needs to be decompressed and superimposed on all pixels of each frame of image, so as to achieve uniform color rendering and improve image quality.

SUMMARY

In view of the above technical problem, it is necessary to provide a method and a device for decompressing Demura compensation value based on a random-access bit stream.

In a first aspect, the present disclosure provides a method for decompressing Demura compensation value based on a random-access bit stream. The method includes: reading a target compression code corresponding to a target pixel set according to a screen refresh instruction in response to the screen refresh instruction, and decoding the target compression code to obtain Demura compensation values.

In some embodiments, the screen refresh instruction carries coordinates of a starting pixel of an area to be updated and a total number of rows of pixels to be updated; the target compression code includes a plurality of data blocks of the compression code; the reading the target compression code corresponding to the target pixel set according to the screen refresh instruction in response to the screen refresh instruction includes: analyzing the coordinates of the starting pixel to obtain random access information corresponding to the starting pixel in response to the screen refresh instruction;

locating a starting position corresponding to the area to be updated in a memory according to the random access information; and reading each of the row data blocks of the compression code from the starting position sequentially based on the total number of rows of pixels to be updated.

In some embodiments, the random access information includes a group address and an intra-group offset address. The locating the starting position corresponding to the area to be updated in the memory according to the random access information includes: locating a current data group in the memory according to the group address, the starting pixel being located in the current data group; and locating a row data block of the compression code in the current data group according to the intra-group offset address, the starting pixel being located in the row data block of the compression code.

In some embodiments, the decoding the target compression code to obtain the Demura compensation values includes: analyzing the total number of rows of pixels to be updated to obtain a total number of rows of data block bit streams corresponding to pixels to be updated; decoding the data blocks of the compression code sequentially until a number of decoded row data block bit streams is equal to the total number of rows of pixels to be updated; and using all decoded data blocks as the Demura compensation values of the area to be updated.

In some embodiments, the method further includes: performing a pixel compensation on the target pixel set by using the Demura compensation values to obtain a partially corrected page, and instructing to display the partially corrected page.

In a second aspect, the present disclosure provides a method for storing Demura compensation value compression code based on random-access bit stream. The method includes: obtaining a Demura compensation value compression code and global attribute information of a target panel, the Demura compensation value compression code comprising a plurality of data blocks of a compression code; storing the Demura compensation value compression code in a memory based on a preset rule and according to the global attribute information; and calculating storage address information of each row data block of the compression code in the memory, and storing the storage address information in the memory as random access information.

In some embodiments, the storing the Demura compensation value compression code in the memory based on the preset rule and according to the global attribute information includes: dividing the Demura compensation value compression code into data blocks to obtain a plurality of rows of data blocks; grouping binary bit streams corresponding to the Demura compensation value compression code based on the global attribute information to obtain a plurality of binary bit stream data groups, each of the binary bit stream data groups including a preset number of rows of data block bit streams; and storing the plurality of binary bit stream data groups in the memory sequentially.

In some embodiments, the calculating storage address information of each of the row data blocks of the compression code in the memory, and storing the storage address information in the memory as random access information include: calculating a group address of a current group in which each of the row data blocks is located in the memory, and an intra-group offset address of each of the row data blocks within the current group, and storing the group address and the intra-group offset address as random access information of each of the row data blocks in the memory.

In a third aspect, the present disclosure provides a Device for decompressing Demura compensation value based on random-access bit stream. The device includes a target compression code reading module and a Demura compensation value decoding module.

The target compression code reading module is configured to read a target compression code corresponding to a target pixel set according to a screen refresh instruction in response to the screen refresh instruction.

The Demura compensation value decoding module is configured to decode the target compression code to obtain Demura compensation values.

In a fourth aspect, the present disclosure further provides a device for storing Demura compensation value compression code based on random-access bit stream. The device includes: a compression code obtaining module, a compression code storing module, and a random access information calculating module.

The compression code obtaining module is configured to obtain a Demura compensation value compression code and global attribute information of a target panel.

The compression code storing module is configured to store the Demura compensation value compression code in a memory based on a preset rule and according to the global attribute information.

The random access information calculating module is configured to calculate storage address information of each of the row data blocks of the compression code in the memory, and store the storage address information in the memory as random access information.

DETAILED DESCRIPTION OF THE
EMBODIMENTS

In order to make the purpose, technical solutions and advantages of the disclosure clearer, the disclosure is further described in detail below in combination with the drawings and embodiments. It should be understood that the specific embodiments described herein are only used to explain the disclosure, rather than define the disclosure.

However, the current method for decompressing Demura compensation value cannot be applicable to the application scenario of a partial refresh of the OLED screen. That is, if the partial refresh is required, the system for decompressing Demura compensation value still needs to decode from the beginning, so that the page refresh cannot be completed quickly, and that the full screen refresh still has a certain delay.

The method for decompressing Demura compensation value based on random-access bit streams provided in embodiments of the present disclosure may be applied to a terminal device having an OLED display screen. The terminal device may be, but is not limited to, any personal computer, notebook computer, smartphone, tablet computer, Internet of Things device, or portable wearable device. The Internet of Things device may be an intelligent sound box, an intelligent television, an intelligent air conditioner, an intelligent vehicle-mounted device, or the like. The portable wearable device may be a smart watch, a smart wristband, a head mounted device, or the like.

Figure 1:
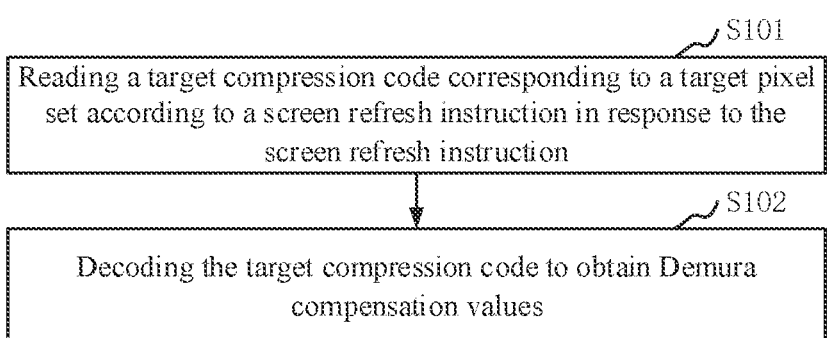
FIG. 1 is a schematic flow diagram of a method for decompressing Demura compensation value based on random-access of bit stream in an embodiment.

In some embodiments, as shown in FIG. 1, a method for decompressing Demura compensation value based on random-access bit stream is provided, and the method is described by taking the method applied to the terminal device mentioned above as an example. The method includes the following steps S101 and S102.

At step S101, a target compression code corresponding to a target pixel set is read according to a screen refresh instruction in response to the screen refresh instruction.

The screen refresh instruction may be an instruction sent and specified by a user to update a part of a page on a browser. For example, a plurality of windows are arranged and displayed on a certain page, and the user desires to refresh information of only one of the windows, and then clicks "refresh" for the window to form the screen refresh instruction. The screen refresh instruction may also be an instruction generated by the page to automatically update information. For example, if a local window on a browsing page is displaying a dynamic graph or a video frame, a screen refresh instruction is generated each time the page is updated. The target pixel set refers to a screen pixel set corresponding to the part of the page to be updated, and the target compression code refers to the Demura compensation value compression code corresponding to the target pixel set.

Specifically, when the user sends the "refresh" instruction for a specified area on a browser page, the browser receives the screen refresh instruction, and sends the screen refresh instruction to a processor chip configured for a screen panel. After receiving the screen refresh instruction, the processor chip extracts pixel sizes and position information of the area to be updated according to the screen refresh instruction. For example, the pixel size of the area to be updated is 50×60, and coordinates of the starting position are (220, 460). The starting position of the target compression code in the read-only memory (ROM) is found according to the starting position coordinates and the pixel size, and the target compression code is read.

At step S102, the target compression code is decoded to obtain Demura compensation values.

The term "decode" means "decompress". Demura refers to generating a compensation value for each pixel on the display screen, and burning the compensation value into a read-only memory (ROM) of a panel display driving chip for compensating the gray scale of each pixel when displaying, and finally making the full screen display evenly. In order to save the ROM resources and reduce the chip cost, the compression code formed by compressing the Demura compensation value is generally stored in the ROM. Therefore, each time the image quality repair or enhancement is required, the compression code corresponding to the compensation value needs to be read from the memory again. The compression code is decompressed and then the compensation value is reconstructed. The corresponding pixel is compensated and corrected by using the compensation value.

Specifically, the compression codes of the compensation values corresponding to the area to be updated are decompressed by using a preset decompression algorithm to obtain the Demura compensation values.

In the above embodiment, the target compression code corresponding to the target pixel set is read according to the screen refresh instruction in response to the screen refresh instruction, and the target compression code is decoded to obtain the Demura compensation values. According to the present embodiment, reading and decompressing the compensation values of partial screen pixels may be performed when the page is partially refreshed. Compared with the relating method, where the reading and decompressing the compensation values of pixels needs to be performed from the beginning of the page every time the page is partially refreshed, the decompression speed of the embodiment of the present application is favorably improved, thereby improving the response speed of the subsequent page refresh, reducing the page refresh delay, and providing a faster switching effect of image quality for the user.

Figure 2:
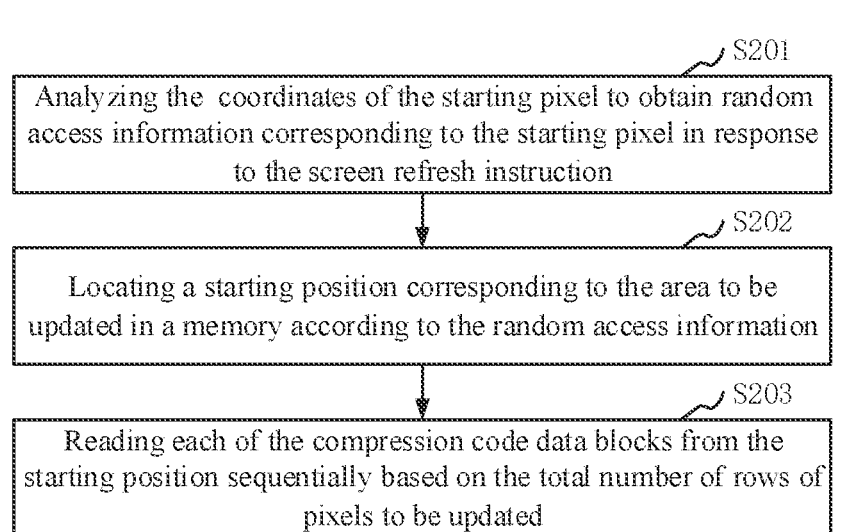
FIG. 2 is a schematic flow diagram of a step of reading target compression code in an embodiment.

In an embodiment, the screen refresh instruction carries coordinates of a starting pixel of an area to be updated and a total number of rows of pixels to be updated, and the target compression code includes a plurality of data blocks of the compression code. As shown in FIG. 2, the above step S101 includes steps S201 to S203.

At step S201, the coordinates of the starting pixel are analyzed to obtain random access information corresponding to the starting pixel in response to the screen refresh instruction.

The random access information refers to access address information of a compression code data block corresponding to each pixel.

Specifically, when a processor receives the screen refresh instruction, the access address information of the corresponding row data block of the compression code stored in the ROM is found according to the coordinates of the starting pixel of the area to be updated carried in the screen refresh instruction. For example, the access address information is the fifth group the third row.

At step S202, a starting position corresponding to the area to be updated is located in a memory according to the random access information.

Specifically, in a process of reading data, the starting position is found in the memory according to the access address information, for example, the fifth group third row.

At step S203, each of the row data blocks of the compression code are read from the starting position sequentially based on the total number of rows of pixels to be updated.

The target compression code is stored in the form of a plurality of row data blocks.

Specifically, based on the total number of rows of pixels to be updated, for example, 50 rows of pixels need to be updated, the processor reads the data blocks of the compression code from the starting position in the memory row by row, and reads the row data blocks of the compression code of 50 rows in total.

According to the above embodiment, the random access information is preset for each row data block of the compression code. Each time a row data block of the compression code is accessed and read, the position of the starting pixel of the area to be updated and the total number of rows of pixels to be updated may be quickly located by the random access information without having to start reading from the beginning, so that the reading speed is improved, and the efficiency of subsequent decompression is improved.

In an embodiment, the random access information includes a group address and an intra-group offset address. The above step S202 includes: locating a current data group in the memory, in which the starting pixel is located, according to the group address, and locating a row data block of the compression code in the current data group, in which the starting pixel is located, according to the intra-group offset address.

Since the Demura compensation values are compressed by blocks one after another during the compression, the obtained compression code is also in the form of blocks of data blocks of the compression code. A size of the data block is generally set flexibly in advance according to actual conditions. Each data block of the compression code is a binary bit stream. For example, the size of each data block of the compression code may be 24×4, 8×4, or the like. Since data in a memory device such as the ROM are stored by rows and columns, and stored data in one row includes a plurality of data blocks of the compression code. The number of data blocks included in one row may be determined by a width of the screen. For example, the width of an OLED screen is W. and a length of each data block is M, thus, the number of data blocks included in one row is $n=[(W+M-1)/M]$, that is, n is a least integer function of $(W+M-1)/M$. These data blocks of the compression code are spliced and stored block by block during storage, and data blocks in each row may be referred to as a row data block bit stream. Row data block bit streams of a preset number of rows form a data group. For example, row data block bit streams of every 32 rows define a data group. All data in the data group are binary bit streams of the compressed compensation values. The random access information stores information for random access to a row data block binary bit stream. The information includes a group address of a group in which the row data block bit stream is located, and an intra-group offset address of each data block in the row. The group address is denoted as group_byte_addr, and the intra-group offset address is denoted as line_offset_addr.

Specifically, the current data group is first found according to the group address corresponding to the starting pixel, and then the row data block of the compression code corresponding to the starting pixel is found in the current data group according to the intra-group offset address.

According to the above embodiment, the group address and the intra-group offset address are set for each row data block of the compression code, which is advantageous to randomly read the position information of each row data block of the compression code, thereby realizing a random access to pixel compression codes in a local area.

In an embodiment, the step S102 includes: analyzing the total number of rows of pixels to be updated to obtain a total number of rows of row data block bit streams corresponding to pixels to be updated; decoding the row data blocks of the compression code sequentially until the number of decoded row data block bit streams is equal to the total number of rows of pixels to be updated; and using all decoded data blocks as the Demura compensation values of the area to be updated.

Specifically, the processor analyzes to obtain the corresponding total number of rows of the row data blocks of the compression code according to the total number of rows of pixels to be updated, for example, 50 rows of data blocks. The row data block of the compression code is decompressed as the row data block of the compression code is read, the row data blocks of the compression code are decompressed one by one, and stop reading when the row data blocks of the compression code in the 50th row are decoded, and stop decompressing at the same time. The decompression code corresponding to all the decoded data blocks is used as the Demura compensation values of the areas to be updated.

According to the above embodiment, the decompression may be quickly performed by reading while decoding, thereby increasing the decompression speed.

In an embodiment, the above method further includes: performing a pixel compensation on the target pixel set by using the Demura compensation values to obtain a partially corrected page, and instructing to display the partially corrected page.

Specifically, the processor chip performs the pixel compensation on the target pixel set corresponding to the area to be updated by using the Demura compensation values obtained by decompressing to obtain an updated page, namely, a partially corrected page, and instructs to display the partially corrected page.

The above embodiment can be adapted to the application scenario of the partial update, thereby reducing a time delay caused by the full screen update and improving a page response speed.

Figure 3:
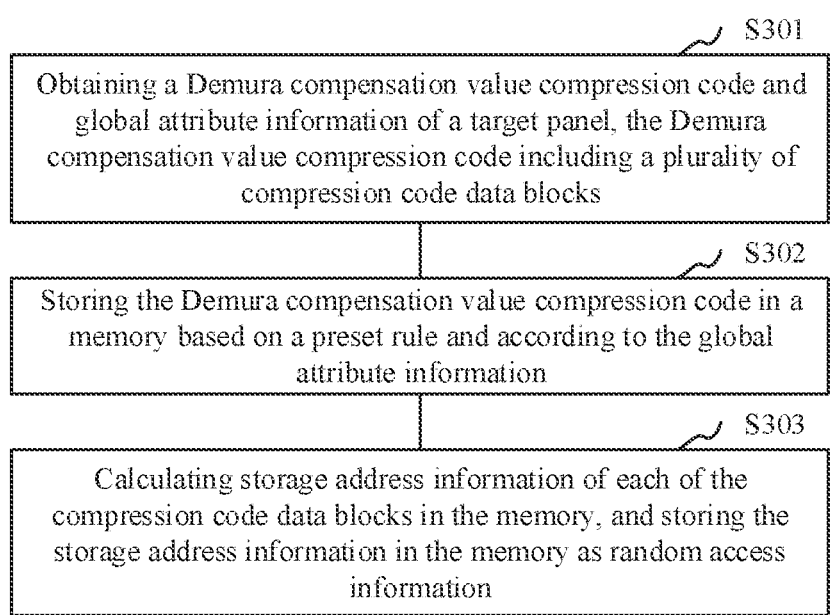
FIG. 3 is a schematic flow diagram of a method for storing Demura compensation value compression code based on random-access bit stream in an embodiment.

As shown in FIG. 3, the present disclosure further provides a method for storing Demura compensation value compression code based on random-access bit streams, including the following steps S301 to S303.

At step S301, a Demura compensation value compression code and global attribute information of a target panel are obtained, where the Demura compensation value compression code includes a plurality of data blocks of the compression code.

Where the global attribute information refers to common information of all data blocks, such as a screen size of the current target panel, a bit width of the original Demura compensation value, and the like. The Demura compensation value compression code is composed of a plurality of data blocks of the compression code.

Specifically, during the Demura process of the panel, after the Demura compensation values are generated by blocks one after another, the Demura compensation value compression code is generated after the compensation value is compressed. The processor acquires the Demura compensation value compression code and acquires global attribute information of the current panel, such as the screen size. The global attribute information is stored in the ROM.

At step S302, the Demura compensation value compression code is stored in a memory based on a preset rule according to the global attribute information.

Specifically, the compression code of all Demura compensation values are stored in the ROM based on a preset rule according to the global attribute information, for example, the screen size or the pixel size. The specific storage manner is that, for example, a plurality of row data blocks of the compression code are stored as a group, for which a group number is set.

At step S303, storage address information of each of the row data blocks of the compression code in the memory is calculated, and the storage address information is stored in the memory as random access information.

Specifically, the chip stores the storage address of each row data block of the compression code separately in a preset area in the ROM as random access information according to the storage address of each row data block of the compression code in the ROM.

According to the above embodiment, the Demura compensation value compression code is stored by blocks one after another, and the storage address of each row data block of the compression code is calculated, which is beneficial to subsequent random access and reading.

In an embodiment, the step S302 includes: dividing the Demura compensation value compression code into data blocks to obtain a plurality of rows of data blocks; grouping binary bit streams corresponding to the Demura compensation value compression code based on the global attribute information to obtain a plurality of binary bit stream data groups, where each of the binary bit stream data groups includes row data block bit streams of a preset number of rows; and storing the plurality of binary bit stream data groups in the memory sequentially.

Figure 4:
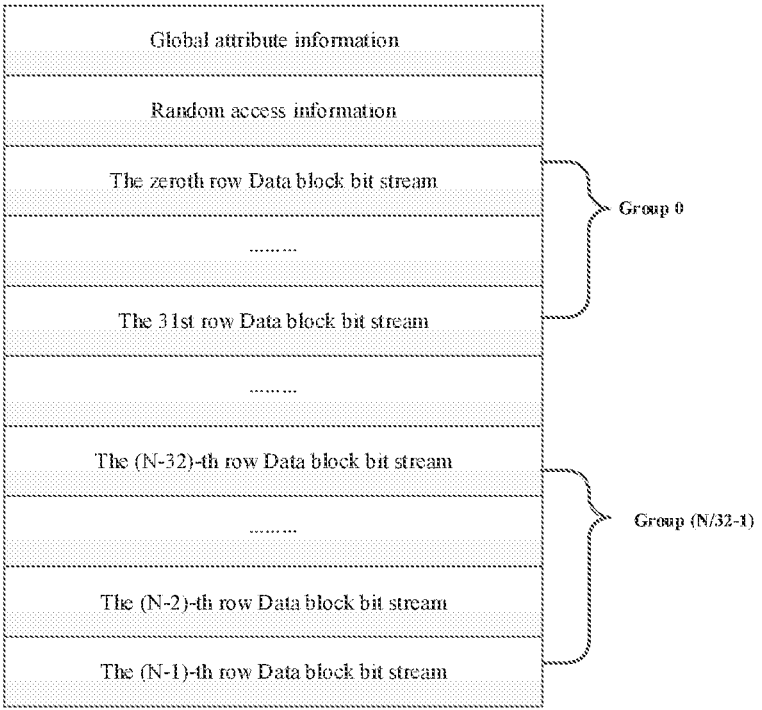
FIG. 4 is a schematic structural view showing a storing structure for a compression code in an embodiment.

Specifically, as shown in FIG. 4, since the Demura compensation values are compressed by blocks one after another during the compression, the obtained compression code is also in the form of data blocks of the compression code. Since the memory device such as the ROM stores by rows and columns, stored data of one row includes a plurality of data blocks of the compression code, and the number of data blocks included in one row may be determined by the screen width. For example, the width of an OLED screen is W. and the length of each data block is M, thus, the number of data blocks included in one row is $n=[(W+M-1)/M]$, that is, n is a least integer function of $(W+M-1)/M$. These data blocks of the compression code are spliced and stored by blocks one after another during the storage, and data blocks in each row may be referred to as a row data block bit stream. Thus binary bit streams corresponding to the Demura compensation value compression code may be grouped based on the global attribute information. The row data block bit stream of the preset number of rows form a binary bit stream data group ("data group" for short). For example, row data block bit streams of every 32 rows are referred to as a data group. All data in the binary bit stream data group are binary bit streams of the compressed compensation values. In the order of the bit streams, a plurality of binary bit stream data groups are sequentially stored in the ROM.

According to the above embodiment, the compression code is stored in the form of blocks and groups to provide a data basis for subsequent random reading of the compression codes.

In an embodiment, the step S303 includes: calculating a group address of a current group in which each of the row data blocks in the memory is located, and an intra-group offset address of each of the row data blocks within the current group; and storing the group address and the intra-group offset address as random access information of each of the row data blocks in the memory.

Specifically, as shown in FIG. 4, the random access information stores information for a random access to a row data block binary bit stream. The information includes a group address of a group in which the row data block binary bit stream is located, and an intra-group offset address of the row data blocks of the compression code. The group address is denoted as group_byte_addr, and the intra-group offset address is denoted as line_offset_addr. Finally, in all binary bit streams, the position cur_line_bits_addr of the binary bit stream corresponding to the row data block of the compression code is:

$$cur\_line\_bits\_addr=group\_byte\_addr+line\_off\text{-}set\_addr \qquad (1)$$

By means of the position cur_line_bits_addr, the binary bit stream of any row data block of the compression code may be randomly decoded to be adapted to the application scenario in which the OLED panel is partially refreshed.

According to the above embodiment, the group address and the intra-group offset address are set to facilitate subsequent quick positioning of the row data block address, thereby realizing the random access.

In some embodiments of the present disclosure, the Demura compensation value compression code is stored according to a preset organization form of row and group, and the random access information of each data block is stored, so as to provide a data basis for the subsequent partial refresh of the panel, thereby improving the speed of accessing and reading the compression code during the partial refresh of the panel, and improving the response speed of the page refresh.

It should be understood that although the steps in the flowcharts related to the embodiments described above are shown in sequence as indicated by the arrows, these steps are not necessarily performed in sequence as indicated by the arrows. Unless expressly stated herein, these steps are not performed in a strict order, and may be performed in other orders. Moreover, at least a portion of the steps in the flowcharts related to the embodiments described above may include a plurality of sub-steps or stages, which are not necessarily performed at the same time, but may be performed at different time, and t the sub-steps or stages may not necessarily be performed in sequence, but may be performed in turn or alternately with other steps, or with at least a portion of the sub-steps or phases of other steps.

Based on the same concept, an embodiment of the present disclosure further provides an Device for decompressing Demura compensation value based on random-access bit streams for implementing the above Method for decompressing Demura compensation value based on random-access bit streams. The implementation of the solution provided by the device is similar to that described in the above method. Therefore, specific limitations in one or more embodiments of the Device for decompressing Demura compensation value based on random-access bit streams provided below can refer to the foregoing limitations of the method for decompressing Demura compensation value based on random-access bit stream, and details are not described here.

Figure 5:
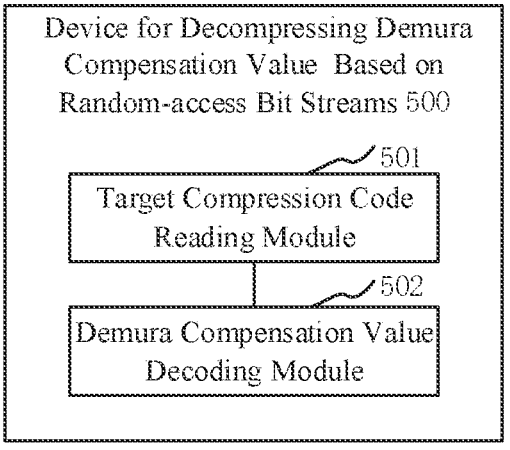
FIG. 5 is a structural block view showing a device for decompressing Demura compensation value based on random-access bit stream in an embodiment.

In an embodiment, as shown in FIG. 5, a Device for decompressing Demura compensation value based on random-access bit stream 500 is provided, and includes a target compression code reading module 501 and a Demura compensation value decoding module 502.

The target compression code reading module 501 is configured to read a target compression code corresponding to a target pixel set according to a screen refresh instruction in response to the screen refresh instruction.

The Demura compensation value decoding module 502 is configured to decode the target compression code to obtain Demura compensation values.

In some embodiments, the screen refresh instruction carries starting pixel coordinates of an area to be updated and a total number of rows of pixels to be updated, and the target compression code includes a plurality of data blocks of the compression code.

The target compression code reading module 501 is further configured to: analyze the coordinates of the starting pixel to obtain random access information corresponding to a starting pixel in response to the screen refresh instruction, locate a starting position corresponding to the area to be updated in a memory according to the random access information, and read each of the row data blocks of the compression code from the starting position sequentially based on the total number of rows of pixels to be updated.

In some embodiments, the random access information includes a group address and an intra-group offset address. The target compression code reading module 501, configured to locate a starting position corresponding to the area to be updated in a memory according to the random access information, is specifically configured to: locate a current data group in the memory, in which the starting pixel is located, according to the group address, and locate a row data block of the compression code in the current data group, in which the starting pixel is located, according to the intra-group offset address.

In some embodiments, the Demura compensation value decoding module 502, configured to decode the target compression code to obtain Demura compensation values, is specifically configured to: analyze the total number of rows of pixels to be updated to obtain a total number of rows of the row data block bit streams corresponding to pixels to be updated; decode the row data blocks of the compression code sequentially until the number of row decoded data block bit streams is equal to the total number of rows of pixels to be updated; and use all decoded data blocks as the Demura compensation values of the area to be updated.

In some embodiments, the Device for decompressing Demura compensation value based on random-access bit stream 500 further includes a page correcting unit. The page correcting unit is configured to: perform a pixel compensation on the target pixel set by using the Demura compensation values to obtain a partially corrected page, and instructing to display the partially corrected page.

Based on the same concept, an embodiment of the present disclosure further provides a device for storing Demura compensation value compression code based on random-access of bit stream for implementing the above method for storing Demura compensation value compression code based on random-access bit stream. The implementation of the solutions provided by the device are similar to those described in the above method. Therefore, for specific limitations in one or more embodiments of the device for storing Demura compensation value compression code based on random-access bit stream provided below, please refer to the foregoing limitations of the Method for storing Demura compensation value compression code based on random-access bit stream, and details are not described here.

Figure 6:
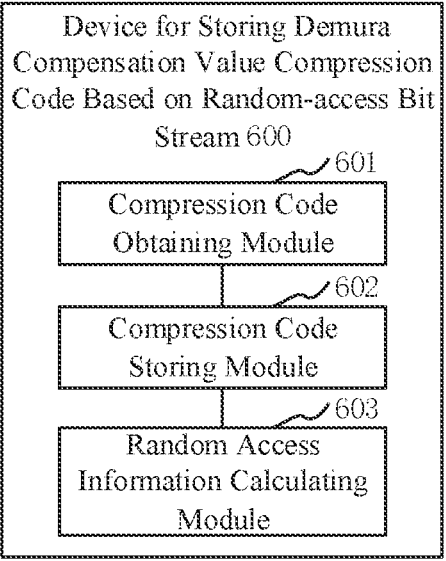
FIG. 6 is a structural block view showing a device for storing Demura compensation value compression code based on random-access bit stream in an embodiment.

In an embodiment, as shown in FIG. 6, a device for storing Demura compensation value compression code based on random-access bit stream 600 is provided, and includes a compression code obtaining module 601, a compression code storing module 602, and a random access information calculating module 603.

The compression code obtaining module 601 is configured to obtain a Demura compensation value compression code and global attribute information of a target panel, and the Demura compensation value compression code includes a plurality of data blocks of the compression code.

The compression code storing module 602 is configured to store the Demura compensation value compression code in a memory based on a preset rule and according to the global attribute information.

The random access information calculating module 603 is configured to calculate storage address information of each of the row data blocks of the compression code in the memory, and store the storage address information in the memory as random access information.

In some embodiments, the compression code storing module 602 is further configured to: divide the Demura compensation value compression code into data blocks to obtain a plurality of rows of data blocks; group binary bit streams corresponding to the Demura compensation value compression code based on the global attribute information to obtain a plurality of binary bit stream data groups, where each of the binary bit stream data groups includes row data block bit streams of a preset number of rows; and store the plurality of binary bit stream data groups in the memory sequentially.

In some embodiments, the random access information calculating module 603 is specifically configured to: calculate a group address of a current group in which each of the data blocks in the memory is located, and an intra-group offset address of each of the row data blocks within the current group; and store the group address and the intra-group offset address as random access information of each of the row data blocks in the memory.

Each module in the device for decompressing Demura compensation value based on random-access bit stream or the device for storing Demura compensation value compression code based on random-access bit stream above may be implemented in whole or in part by software, hardware and combinations thereof. The modules may be embedded in or independent of a processor of a computer device in a way of hardware, or may be stored in a memory of a computer device in a way of software to make it easy for the processor to call and perform operations corresponding to the modules.

It should be noted that user information (including, but not limited to, user equipment information, user personal information, and the like) and data (including, but not limited to, data for analysis, stored data, displayed data, and the like) related to the present disclosure are information and data that are authorized by the user or sufficiently authorized by each party.

A person of ordinary skill in the art may understand that all or part of the processes in the methods of the above embodiments may be achieved by the relevant hardware instructed by the computer programs. The computer programs may be stored in a non-transitory computer readable storage medium, and when being executed, perform the processes such as those of the methods of the embodiments described above. The memory, database, or other medium recited in the embodiments of the disclosure include at least one of non-transitory and transitory memory. Non-transitory memory includes read-only memory (ROM), magnetic tape, floppy disk, flash memory, optical memory, high density embedded non-transitory memory, resistive random access memory (ReRAM), magnetoresistive random access memory (MRAM), ferroelectric random access memory (FRAM), phase change memory (PCM), or graphene memory, etc. Transitory memory includes random access memory (RAM) or external cache memory, etc. For illustration rather than limitation, RAM may be in various forms, such as static random access memory (SRAM) or dynamic random access memory (DRAM), etc. The databases involved in the embodiments of the present disclosure may include at least one of a relational database and a non-relational database. The non-relational databases may include, but are not limited to, a block chain-based distributed database, etc. The processors involved in the embodiments of the present disclosure may be but are not limited to general purpose processors, central processing units, graphics processors, digital signal processors, programmable logicians, quantum computing-based data processing logicians, etc.

In some the embodiments, the present disclosure provides a computer apparatus, including a memory and a processor. A computer program is stored on the memory, and the computer program, when executed by the processor, causes the processor to perform steps of any method of the present disclosure.

In some the embodiments, the present disclosure provides a computer product, including a computer program. The computer program, when executed by a processor, causes the processor to perform steps of any method of the present disclosure.

The technical features of the foregoing embodiments may be arbitrarily combined. For brevity, not all possible combinations of the technical features in the foregoing embodiments are described. However, the combinations of these technical features should be considered to be included within the scope of the present disclosure, as long as the combinations are not contradictory.

The above described embodiments are several implementations of the present disclosure, and the description thereof is specific and detailed, but cannot be construed as a limitation to the scope of the present disclosure. It should be noted that for a person of ordinary skill in the art, various modifications and improvements may be made without departing from the concept of the present disclosure, and all these modifications and improvements are all within the protection scope of the present disclosure. Therefore, the protection scope of the present disclosure shall be subject to the attached claims.

What is claimed is:

1. A method for decompressing Demura compensation value based on random-access bit stream, comprising:
   reading a target compression code corresponding to a target pixel set according to a screen refresh instruction in response to the screen refresh instruction; and
   decoding the target compression code to obtain Demura compensation values;
   wherein the target compression code is stored in a form of a plurality of row data blocks;
   stored data in one row comprise a plurality of data blocks of the compression code;
   the data blocks in one row defines a row data block bit stream; and
   row data block bit streams of a preset number of rows define a data group.

2. The method of claim 1, wherein the screen refresh instruction carries coordinates of a starting pixel of an area to be updated and a total number of rows of pixels to be updated.

3. The method of claim 2, wherein the reading the target compression code corresponding to the target pixel set according to the screen refresh instruction in response to the screen refresh instruction comprises:
   analyzing the coordinates of the starting pixel to obtain random access information corresponding to the starting pixel in response to the screen refresh instruction;
   locating a starting position corresponding to the area to be updated in a memory according to the random access information; and
   reading each row data block of the compression code from the starting position sequentially based on the total number of rows of pixels to be updated.

4. The method of claim 3, wherein:
   the random access information comprises a group address and an intra-group offset address; and
   the locating the starting position corresponding to the area to be updated in the memory according to the random access information comprises:

locating a current data group in the memory according to the group address, the starting pixel being located in the current data group; and locating a row data block of the compression code in the current data group according to the intra-group offset address, the starting pixel being located in the row data block of the compression code.

5. The method of claim 2, wherein the decoding the target compression code to obtain the Demura compensation values comprises:

analyzing the total number of rows of pixels to be updated to obtain a total number of rows of data block bit streams corresponding to pixels to be updated;

decoding the data blocks of the compression code sequentially until a number of decoded row data block bit streams is equal to the total number of rows of pixels to be updated; and using all decoded data blocks as the Demura compensation values of the area to be updated.

6. The method of claim 1, further comprising:

performing a pixel compensation on the target pixel set by using the Demura compensation values to obtain a partially corrected page; and instructing to display the partially corrected page.

7. The method of claim 1, wherein the screen refresh instruction is an instruction sent and specified to update a part of a page on a browser, or an instruction generated by a page to automatically update information.

8. A method for storing Demura compensation value compression code based on random-access bit streams, comprising:

obtaining a Demura compensation value compression code and global attribute information of a target panel, the Demura compensation value compression code comprising a plurality of data blocks of a compression code;

storing the Demura compensation value compression code in a memory based on a preset rule and according to the global attribute information; and calculating storage address information of each row data block of the compression code in the memory, and storing the storage address information in the memory as random access information.

9. The method of claim 8, wherein the storing the Demura compensation value compression code in the memory based on the preset rule and according to the global attribute information comprises:

dividing the Demura compensation value compression code into data blocks to obtain a plurality of rows of data blocks;

grouping binary bit streams corresponding to the Demura compensation value compression code based on the global attribute information to obtain a plurality of binary bit stream data groups, each of the binary bit stream data groups comprising a preset number of rows of data block bit streams; and storing the plurality of binary bit stream data groups in the memory sequentially.

10. The method of claim 8, wherein the calculating storage address information of each row data block of the compression code in the memory, and storing the storage address information in the memory as random access information comprise:

calculating a group address of a current group in which each of the plurality of row data blocks is located in the memory, and an intra-group offset address of each of the plurality of row data blocks within the current group; and storing the group address and the intra-group offset address as random access information of each of the plurality of row data blocks in the memory.

11. A computer apparatus, comprising a memory and a processor, wherein a computer program is stored on the memory, and the computer program, when executed by the processor, causes the processor to perform steps of the method of claim 1.

12. A non-transitory computer-readable storage medium, having a computer program stored thereon, wherein, the computer program, when executed by a processor, causes the processor to perform steps of the method of claim 1.

* * * * *